Aug. 5, 1958 W. J. CHERONES ET AL 2,846,640
CONTROL CIRCUITS
Filed June 13, 1955 3 Sheets-Sheet 1
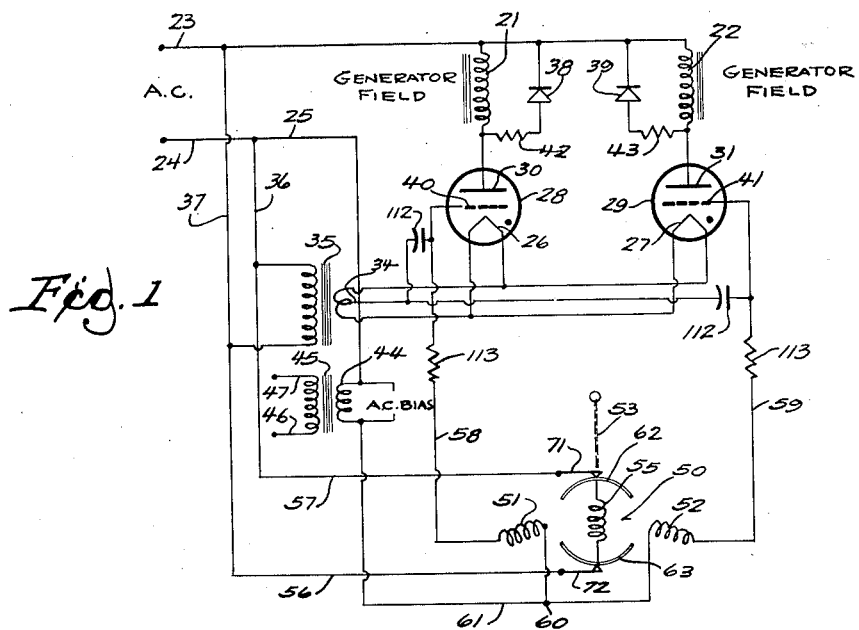
Fig. 1
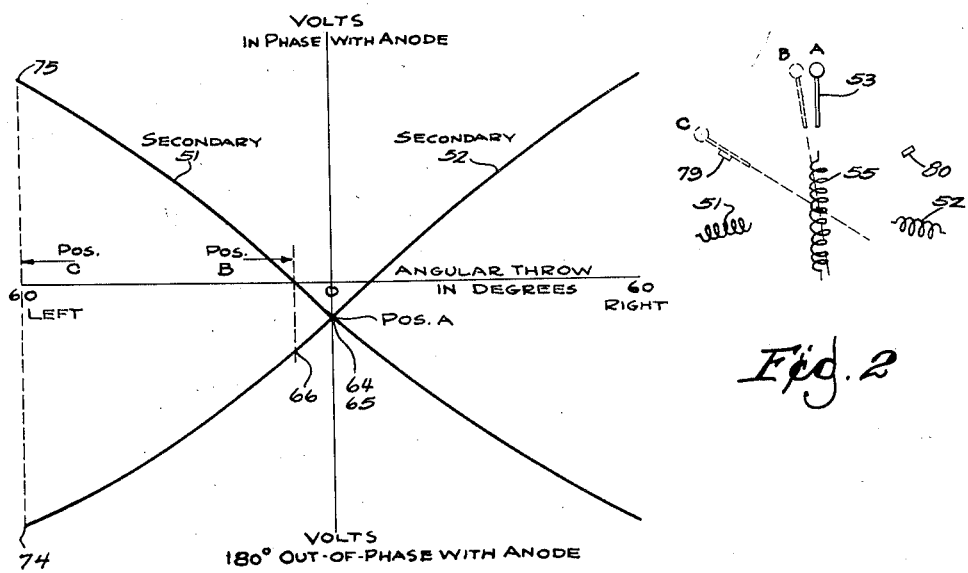
Fig. 2
Fig. 3
INVENTORS
WILLIAM J. CHERONES
LESTER A. PRICE
BY
Wheeler, Wheeler & Wheeler
ATTORNEYS Aug. 5, 1958  W. J. CHERONES ET AL  2,846,640
CONTROL CIRCUITS
Filed June 13, 1955  3 Sheets-Sheet 2
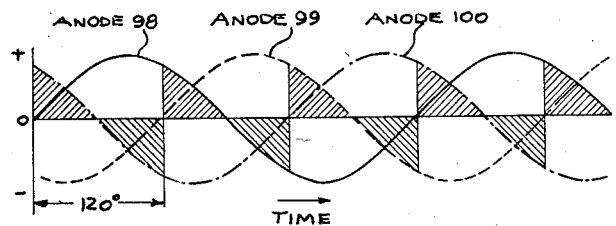
Fig. 14
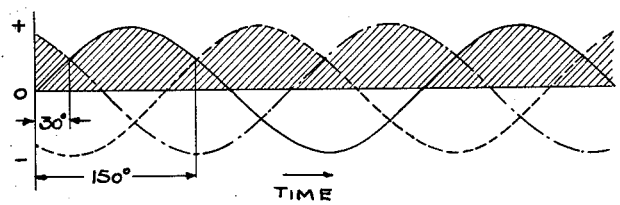
Fig. 15
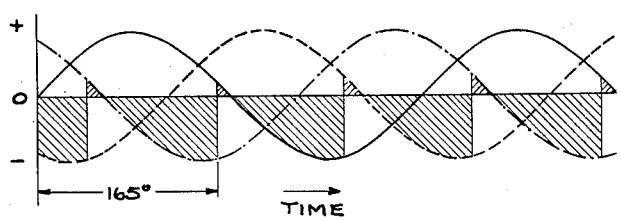
Fig. 16
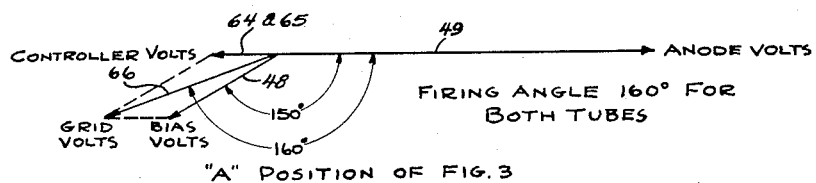
Fig. 4  "A" POSITION OF FIG. 3
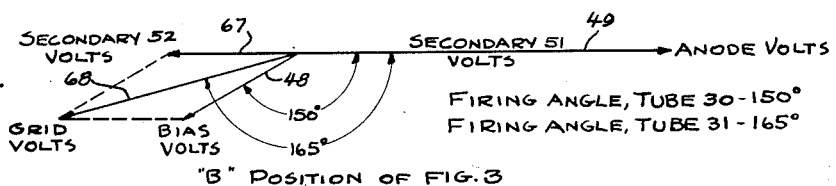
Fig. 5  "B" POSITION OF FIG. 3
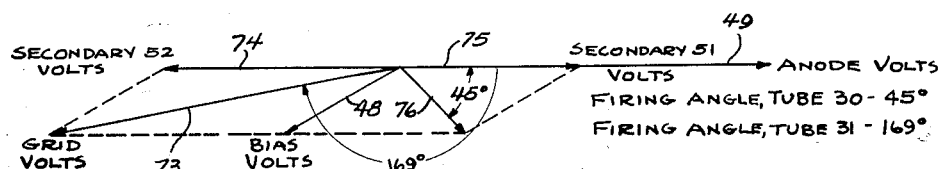
Fig. 6  "C" POSITION OF FIG. 3
INVENTORS
WILLIAM J. CHERONES
LESTER A. PRICE
BY Wheeler, Wheeler & Wheeler
ATTORNEYS

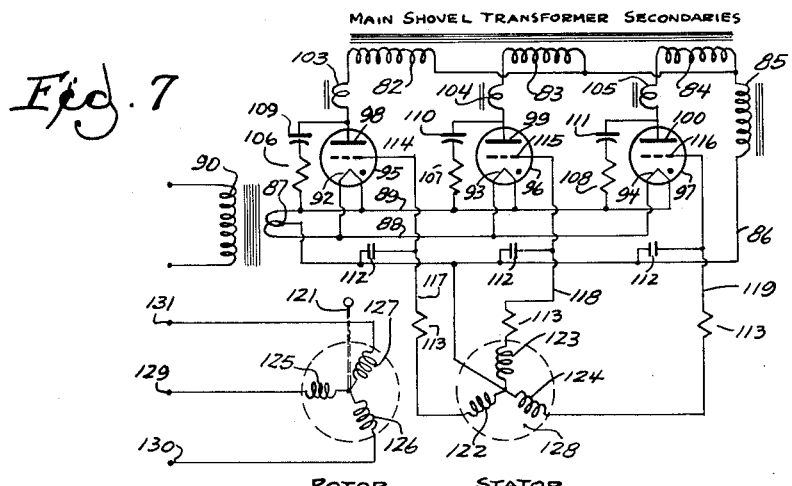
Fig. 7
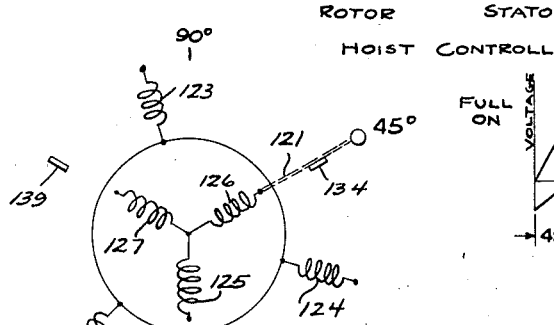
Fig. 8
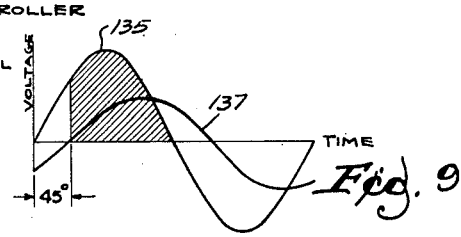
Fig. 9
Fig. 10
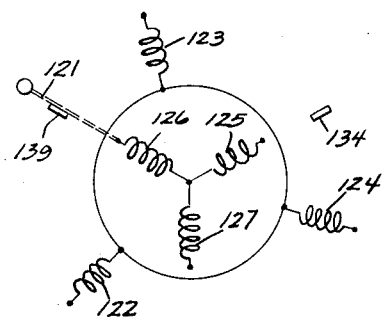
Fig. 11
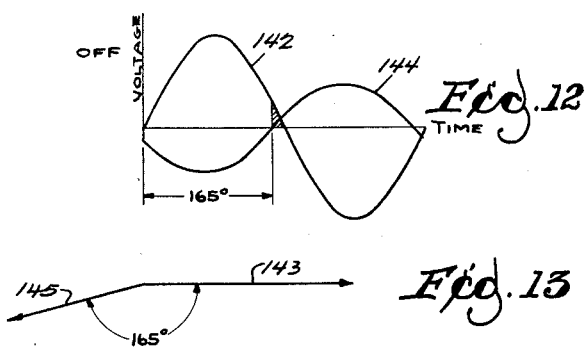
Fig. 12
Fig. 13
INVENTORS
WILLIAM J. CHERONES
LESTER A. PRICE
BY
Wheeler, Wheeler & Wheeler
ATTORNEYS United States Patent Office 2,846,640
Patented Aug. 5, 1958

2,846,640

CONTROL CIRCUITS

William J. Cherones and Lester A. Price, Milwaukee, Wis., assignors to Harnischfeger Corporation, Milwaukee, Wis., a corporation of Wisconsin Application June 13, 1955, Serial No. 515,078

12 Claims. (Cl. 322—59)

This invention relates to improved control circuits for heavy duty electrical apparatus of the type used in power shovels, etc. The patent to Jacobs 2,462,747 shows apparatus of this general nature.

It is conventional to provide control systems for control of speed and direction of large dynamoelectric machines used in power excavators and the like which include control rheostats directly or remotely varying the excitation of the dynamoelectric machines, both from the standpoint of magnitude and polarity. It is also conventional to provide similar control systems including control rheostats for directly or remotely controlling the excitation of electromagnetic couplings and the like for operating various excavator motions. Because of the inherent nature of conventional type of cam or drum controllers used in conventional apparatus of this type, a substantial amount of manual effort is demanded of the operator in actuating the controllers.

In the device of the present invention, however, induction controllers are used in conjunction with space discharge devices (thyratrons and the like) in the control circuit whereby to substantially completely eliminate the resistance offered by the controller to changes in its position. The voltage induced in the secondary of the controller is simply impressed on the grid of the thyratron, no substantial current flowing in the grid circuit. The secondaries of the induction controllers are thus "open circuited." Accordingly, the inductive drag or torque exerted on the controller handle is extremely minute. Moreover, mechanical friction is substantially completely eliminated because of the electromagnetic circuit in the induction controller. Accordingly, stepless control is effected in a specific controller structure which requires substantially no manual effort for its manipulation.

Our control circuits are applicable in various modifications to the various electrical and mechanical requirements of power excavators. In one embodiment of the invention we employ thyratrons with an induction controller in their grid circuits to control the excitation of fields of reversed polarity of a generator which supplies current to the reversing motors which are used in the crowd and propel motors in the shovel; similar control circuitry and machinery is employed in controlling the swing motion. In another embodiment of the invention we employ thyratrons in polyphase relation with a polyphase induction controller having windings in the respective grid circuits of the thyratrons to supply power to a magnetic clutch to which the hoist drum is connected.

The control circuit of our invention has the further advantage of speeding the response of the apparatus to changes demanded by the operator. The invention includes provision for reducing the time required for current changes in the field windings of rotary apparatus powering the hoist, swing, crowd and propel movements of the shovel.

Overvoltage is intentionally applied to accelerate initial current flow through the apparatus being controlled. The applied voltage is then gradually reduced as the steady state current value is approached by using ballast resistors in the back rectifier circuits of the swing, crowd and propel apparatus and reactors in series with the anodes of the hoist apparatus. The ballast resistors in the back rectifier circuits also bring about rapid decay of current by effectively reducing the time constant of the controlled fields. In the case of the hoist apparatus, in which the dipper and dipper stick constitute an overhauling load, we provide for inversion of the direct current voltage in the electromagnetic coupling which powers the hoist drum to quickly decay the field current and render the load more responsive to gravity.

In all embodiments of our control circuit the current supplied to the using device is controlled in magnitude by selectively exciting the grids of the thyratrons, desirably by shifting the phase angle of the alternating current voltage which excites the grid of the thyratron with respect to the alternating current voltage impressed on the anode of the thyratron.

In the drawings:

Fig. 1 is a circuit diagram of the embodiment of our control circuit as applied to the control of the generator which excites the swing, crowd and propel motors of the shovel.

Fig. 2 is a diagrammatic view illustrating the mechanical relationship between the primary and secondary windings of the induction controller illustrated in the circuit of Fig. 1.

Fig. 3 is a graph relating the position of the controller handle to the voltages induced in the respective secondary windings of the controller illustrated in Fig. 1.

Figs. 4, 5 and 6 are vector diagrams illustrating the change in relationship between the phase of the voltage impressed on the anode of the thyratrons shown in Fig. 1 with respect to the phase of the grid voltage, depending upon the position assumed by the windings of the induction controller illustrated in Fig. 1.

Fig. 7 is a circuit diagram of a modified embodiment of our circuit for controlling the excitation of the field of an electromagnetic coupling which is connected to the hoist drum of the shovel.

Figs. 8 and 11 are diagrammatic views illustrating the three-phase induction controller used in the circuit of Fig. 7. Fig. 8 illustrates the relative positions of the induction controller windings for supply of maximum current to the clutch. Fig. 11 illustrates the relative positions of the induction controller windings for thyratron cut off.

Figs. 9 and 12 are wave diagrams showing the relationship between thyratron anode voltage and grid voltage for the setting of the controller shown in Figs. 8 and 11 respectively.

Figs. 10 and 13 are vector diagrams showing the phase relationship between the grid voltage and anode voltage of the thyratron for the respective positions of the controller shown in Figs. 8 and 11.

Figs. 14, 15 and 16 are wave form diagrams illustrating different conditions of thyratron operation under different conditions of grid excitation in the device of Fig. 7.

Our electric control circuit embodiment for variably exciting generator fields 21 and 22 is illustrated in Figs. 1–6. Generator fields 21 and 22 are of reversed polarity and the generator output windings are connected to reversing motors in a power shovel or the like. The motors excited by the generator output windings will run in one direction or the other depending on which of the generator fields 21 and 22 is excited. The speed-torque characteristics of the motor being controlled will depend upon the degree of excitation of the respective generator fields.

A single-phase source of alternating current voltage is supplied by lines 23, 24. Line 23 is connected directly to corresponding terminals of the fields 21, 22. Line 24 is connected through line 25 and the center tap 34 of filament transformer 35 to the respective filaments 26, 27 of thyratrons 28, 29. The thyratrons have their respective anodes 30, 31 connected to the terminals of the generator fields 21, 22 opposite their terminal connected to line 23. Filament transformer 35 receives power from lines 36 and 37 connected respectively to the lines 24, 23. Each thyratron 28, 29 comprises a half-wave rectifier supplying current to its respective load 21, 22 for the whole or a fractional part of the positive pulse of alternating current voltage impressed on the thyratron anodes, as determined by thyratron grid excitation.

To sustain generator field current during that portion of time in which the thyratrons are cut off, we provide conventional back rectifiers 38, 39 in parallel with the respective generator fields 21, 22, and in series with ballast resistors 42, 43.

Grid bias voltage is supplied to the thyratron grids 40, 41 through the secondary winding 44 of an alternating current grid bias transformer 45. The alternating current voltage supplied by bias transformer 45 is desirably sufficiently out of phase with the alternating current voltage impressed on the anodes of the tubes so that the generator field currents are essentially zero. In power shovels a three-phase source of alternating current voltage is normally available. Accordingly, we connect the input leads 46, 47 of the bias transformer 45 to a secondary winding of main shovel transformer in such a manner that the grid bias voltage is displaced in phase by 150° (lagging) from the voltage impressed on lines 23, 24. Accordingly, as indicated in Figs. 4 through 6, the bias voltage supplied to the grids 40, 41, designated in these figures by reference character 48, lags the anode voltage, designated in these figures by reference character 49, by 150°.

Superimposed on grid bias voltage 48 is a voltage emanating from an induction controller indicated generally by reference character 50. Induction controller 50 is essentially a variable transformer having dual open circuit secondary windings 51, 52 and a common primary winding 55. Primary winding 55 is excited by voltage in phase with the anode voltage of the thyratrons. Primary winding voltage is derived through lines 56 and 57 connected respectively with input lines 23, 24. Corresponding terminals of the respective secondary windings 51, 52 of the induction controller 50 are connected to grids 40, 41 by lines 58, 59. Corresponding opposite terminals of the secondary windings 51, 52 have a common connection at 60 with line 61 connected to winding 44 of the grid bias transformer 45. Accordingly, voltage induced in the respective secondary windings 51, 52 is superimposed upon and vectorially additive to the grid bias voltage supplied by grid bias transformer 45.

The magnitude and phase angles of voltage induced by primary winding 55 in secondary windings 51, 52 will depend on the physical position of primary winding 55. Induced voltage will be at a maximum when the primary coil is aligned with a secondary coil, and at a minimum when the coils are at a right angle. The polarity of the induced voltage depends on the orientation of the poles of the coils. The secondary coils 51, 52 are stationary and the primary coil is rotatable by manipulation of its handle 53 about an axis on which its field will also rotate to link the secondary coils 51, 52. Primary coil 55 is supplied with alternating current voltage through slip rings 62, 63 and sliding contacts 71, 72 connected respectively to lines 57, 56.

Secondary windings 51, 52 of the induction controller 50 are angularly physically positioned more than 180° apart (preferably about 195° apart) so that with the primary winding in its neutral position indicated in full lines at position A in Figs. 2 and 3, there will be a small alternating current voltage induced in each of the secondary windings 51, 52. These voltages are 180° out of phase with respect to the anode voltage. The graph shown in Fig. 3 illustrates these small voltages at position A. These voltages are also indicated by reference characters 64, 65 in Fig. 4.

Bias voltage 48 is vectorially additive to induction controller voltages 64 and 65. Accordingly, the resultant grid voltage impressed on both tubes 28 and 29, with the induction controller in position A, is represented by vector 66 in Fig. 4. For the specific magnitudes of the voltages involved, it may be determined mathematically that vector 66 lags the anode voltage 49 by 160°. Under circumstances such that the critical phase firing angle for the grid voltage of the thyratrons is 155°, both thyratrons will be "cut off" and neither of the generator fields 21, 22 will be excited.

If the controller handle is moved to dotted line position B shown in Figs. 2 and 3, primary winding 55 will be perpendicular to secondary winding 51 so that zero voltage is induced in secondary 51. Primary winding 55 is now more nearly aligned with secondary winding 52 than it was in position A, so that the magnitude of voltage induced in coil 52 is greater, but the coils are oriented so that the secondary voltage is still 180° out of phase with the anode voltage. This condition is illustrated in the vector diagram of Fig. 5 in which the voltage induced in secondary 52 is illustrated by vector 67, the voltage induced in secondary 51 being zero.

In this position of the controller handle tube 29 controlled by secondary 52 remains "cut off" as the vectorial addition of vector 67 and 48 results in vector 68 which may be computed mathematically to be 165° out of phase with the anode voltage 49. However, the only voltage impressed upon grid 40 of tube 28 is the voltage of the bias transformer 45, represented by vector 48, which lags the anode voltage by only 150°. Since this phase angle is less than the critical angle of 155°, tube 28 will fire and produce a small output. The output is small because the tube will fire only toward the end of the positive pulse of anode voltage on the tube.

If the controller handle is moved to the dotted line position C shown in Figs. 2 and 3, the primary winding 55 will be in substantial alignment with both secondary coils 51, 52, and will induce substantial voltage therein. The voltage induced in secondary 52, however, will be 180° out of phase with the anode voltage while the voltage induced in secondary 51 will be in phase with the anode voltage. As indicated by vector 73 in Fig. 6, the resultant voltage impressed on the grid of tube 29 is the vectorial sum of the bias voltage 48 and the voltage 74 induced in secondary 52. Vector 73 lags the anode voltage by 169° and tube 29 remains cut off. However, the vectorial addition of the bias voltage 48 and the in phase voltage induced in secondary 51, represented by vector 75 in Fig. 6, results in an impressed grid voltage represented by vector 76 which lags the anode voltage by only 45°.

Accordingly, tube 28 will fire in an early part of the positive pulse of anode voltage and imposes a relatively large output voltage on generator field 21. In position C the controller handle rests against stop 79 which defines its extreme throw in one direction of operation.

The controller handle may also be moved to an opposite position against stop 80 in which the relative magnitudes and polarities of the voltages induced in secondary windings 51 and 52 will be reversed whereby to cut off tube 28 and fire tube 29. The grid voltage curves under such circumstances are shown toward the right in Fig. 3.

From the foregoing it is clear that we have provided a stepless control circuit for selectively energizing either of the generator fields 21, 22 and that the controller has a neutral position in which there is a voltage of small magnitude out of phase with the anode voltage induced in both secondary windings. Accordingly, with the controller handle in neutral position, both tubes 28, 29 will be biased to cut off by the controller secondary voltages indicated by vectors 64, 65 in Fig. 4, and the tubes will not fire if the voltage supplied by transformer 45 fails for some reason or other. This is an important safety feature and is particularly significant in the neutral position of the controller handle when the operator's attention may be elsewhere. Failure of the bias voltage is not nearly so potentially disastrous under running conditions when the operator is paying attention.

The ballast resistors 42, 43 in the generator field current sustaining circuits including the back rectifiers 38, 39, reduce the proportion of inductance to resistance in the circuit comprising generator field 21, back rectifier 38 and ballast resistor 42 and generator field 22, back rectifier 39 and ballast resistor 43, and hence decrease the electrical time constant thereof. As also explained in the copending application of Lester A. Price entitled "Fast Response Direct Current Power Supply for Inductive Loads," Serial No. 514,881, filed June 13, 1955, this has the important advantage of shortening the time required for changes in load current in response to changes in thyratron grid excitation, and at the same time permits an increase in the voltage impressed on the field coils through the thyratron anodes as a forcing voltage. As indicated in the copending application aforesaid, the ohmic value of resistances 42, 43 is desirably 2.5 times the ohmic value of inductances 21, 22.

Accordingly, changes in the position of controller handle 53 will result in hitherto unobtainable rapid response of the controlled apparatus, the sluggish response characterizing prior apparatus of this type being substantially remedied.

In Fig. 7 we show a control circuit for actuating the field of the electromagnetic coupling which transmits power in a power train from a prime mover to the hoist cable drum in a power shovel. As is conventional in this art, power is applied to the hoist drum in only one direction of operation in order to hoist the dipper. The dipper descends by gravity and hence constitutes an overhauling load. In addition to its other advantages herein pointed out, the circuit shown in Fig. 7 has the advantage of providing for inversion of the direct current field in the electromagnetic coupling. The decaying direct current in the field winding is inverted and pumped back into the alternating current source, thereby speeding flux decay and speeding the gravity response of the dipper.

Because of the substantially greater power requirements of the hoist, a three-phase alternating current source is supplied to excite the three-phase windings of the main shovel transformer secondaries, indicated by reference characters 82, 83 and 84. Other polyphase arrangements are within the scope of the present invention, the instant disclosure of a three-phase system being for exemplification only. The primary windings of the main shovel transformer are desirably delta-connected and the secondary windings are Y connected to one terminal of the field coil 85 of the electromagnetic coupling. The opposite terminal of the field coil 85 is connected through line 86 to the center tap 87 of the secondary winding of the filament transformer 90 and thence through lines 88 and 89 to the respective filaments 92, 93, 94 of the thyratron tubes 95, 96, 97. The thyratrons have their respective anodes 98, 99 and 100 connected through reactors 103, 104, 105 to transformer windings 82, 83, 84.

For each tube we optionally provide a plate to filament circuit including resistances 106, 107, 108, respectively, in series with capacitors 109, 110, 111. The purpose of the reactors and the resistance-capacitor series circuits aforesaid is to increase the time required to transfer the load current from one tube to the next and thus to limit the rate of rise of inverse voltage of each tube. This is called commutating and promotes long tube life. The reactors also permit application of overvoltage during the transient buildup of field current in the electromagnetic coupling. We may also provide sets of series connected resistors 113, and condensers 112 between the respective thyratron grids and filament center tap 87.

Condensers 112 are connected directly between the grid leads 117, 118, 119 and the center tap lead 86. Resistors 113 are in series with grid leads 117, 118, 119 and connect with the center tap 87 through windings 122, 123, 124 of the induction controller. The resistors are of very high ohmic value to limit grid current to a minute value. The condensers add capacity to the internal grid-to-filament capacity of the tube making this value large as compared to the internal anode-to-grid capacity, thereby preventing steep anode voltage transients from affecting the grid voltage.

Similar condensers 112 and resistors 113 are provided in the circuit of Fig. 1 for the same purpose. The condensers 112 are connected directly between grid leads 58, 59 to the center tap 34. The resistors 113 are in series with the grid leads 58, 59 and connect with the center tap 34 through windings 51, 52 of the induction controller.

Each thyratron tube 95, 96, 97 comprises a half-wave rectifier. The voltages in the respective secondary windings 82, 83, 84 of the three-phase transformer are vectorially spaced at phase angles of 120°. Accordingly, the thyratrons 95, 96 and 97 can conduct only during a maximum of 120° of the respective positive pulses of alternating current voltage induced in the secondary windings. This is because the respective secondary windings 82, 83, 84 of the transformer and their respective thyratrons 95, 96, 97 are in parallel connection with the load 85. A particular winding and thyratron combination can deliver instantaneous voltage to the load in excess of the instantaneous voltage of the other winding and thyratron combinations through a phase angle from 30° to 150° of the positive pulse of voltage impressed thereon. From 0°–30° and 150°–180° the instantaneous voltage induced in said particular winding is less than the instantaneous voltage induced in the other windings and, except for the inversion effect hereinafter explained, the particular thyratron will accordingly be cut off.

The respective grids 114, 115, 116 of the respective thyratrons are connected through lines 117, 118 and 119 through three-phase Y connected secondary windings 122, 123, 124 in the stator of an induction controller 128 having three-phase Y connected primary windings 125, 126, 127 in its rotor. The hoist controller 128 is essentially a phase shifting device which may comprise a small three-phase wound rotor induction motor with open circuit secondaries. With the secondary open, no torque is produced and there is no motor action tending to rotate the controller handle 121 connected to the rotor.

The primary windings 125, 126, 127 are energized through lines 129, 130, 131 from a three-phase source of alternating current in step with the three-phase input to the secondaries 82, 83, 84. Accordingly, a rotating magnetic field is established in the three-phase wound primary windings 125, 126, 127 of the controller 128. Three-phase alternating current voltages are thus induced in the secondary windings 122, 123, 124 which will be of substantially equal magnitude, assuming a uniform ratio between the respective primary and secondary windings. If the primary and secondary coils are relatively shifted about the axis of the rotating field, the phase angle between the primary and secondary voltages will shift in direct proportion to the physical angular displacement therebetween. For a hoist controller having a two-pole construction, phase angle and mechanical displacement in degrees will be identical.

For simplification in the collector ring arrangement the primary in our hoist controller is wound on the rotor and the secondary is wound on the stator. The reverse arrangement, of course, is within the scope of the invention.

The magnetic coupling field coil constitutes a highly inductive load. Accordingly, energy stored in the inductive load during conduction of any thyratron during the positive alternation of its impressed alternating current voltage causes the inductive load to generate decay voltage which overcomes the negative supply voltage during the first part of the negative half-cycle of the anode voltage and continue current flow through the conducting tube and load after the end of each positive alternation and until the current flowing through the load has decayed or until the next thyratron in the series fires. This is called inversion (in contradistinction to conversion) and under circumstances hereinafter pointed out will result in the circuit of our invention supplying alternating current to the line.

In Figs. 14, 15 and 16, three conditions are illustrated. In Fig. 14 the hoist controller is arranged so that the grid voltage has a delay angle with respect to anode voltage of 120°. Accordingly, each thyratron will conduct during only the last 60° of the positive pulse if impressed anode voltage. However, the thyratron does not stop conducting when the impressed voltage reaches zero because of the inductive character of the load hereinbefore metioned. Conduction, in fact, continues for the first 60° of negative alternation, this corresponding to the time when the next thyratron in the series is fired. Firing of the next thyratron drives the inverting tube to cut off. Shaded areas in the diagram indicate the instantaneous output voltage for each anode. For the condition illustrated in Fig. 14, the aggregate shaded area above the zero line is equal to the aggregate shaded area below the line. Accordingly, the average is zero and the output of the control circuit to the load is zero.

Fig. 15 represents an adjustment of the hoist controller to a position in which the delay angle of the grid voltage with respect to the anode voltage is only 30°. As indicated in this diagram, maximum output is obtained from the contol system because each tube will fire from 30° to 150°. The load voltage impressed upon the field of the magnetic coupling is entirely above the zero line.

When the hoist controller is adjusted to shift the grid voltage through a phase angle more than 120° lagging the anode voltage, as illustrated in Fig. 16, where the phase shift angle is 165°, any inductive field previously built up in the inductive load is quickly decayed by the inversion action of the thyratron tubes. Only a very small positive output is obtained as indicated by the shaded area above the zero line, substantial values of negative voltage being indicated by the shaded area below the zero line. The shaded area below the line represents stored energy inverted from the direct current voltage supplied by the inductive load to an alternating current voltage restored to the supply line. This inversion will continue only until the stored energy in the inductive load is dissipated whereupon zero output is obtained for grid delay angles between 120° and 180°.

Diagrammatic views showing the hoist controller in various positions of adjustment appear in Figs. 8 and 11. In Fig. 8 the hoist controller is shown with its control handle moved against "full on" stop 134 to provide the maximum output for which the apparatus is adjusted. In this case the anode voltage is represented by curve 135 in Fig. 9 and by vector 136 in Fig. 10.

The grid delay angle in the "full on" position of the controller is desirably set at 45°. The grid voltage is represented by curve 137 in Fig. 9 and by vector 138 in Fig. 10. Thus the output of the three-phase rectifier system will be almost as great as indicated in Fig. 15 where the grid delay angle was 30°, the positive pulse output for any one anode being illustrated by the shaded area in Fig. 9. While the stop 134 could be set for a grid delay angle of 30°, thus developing the maximum output of which the circuit is capable, the relatively small increase in circuit output thus obtained does not warrant increasing the throw of the controller handle. In the preferred arrangement, the arc through which the controller handle may swing is limited to 120°, from a 45° grid delay angle to a 165° grid delay angle. An increase of 15° in the arc through which the handle swings (to a grid delay angle of 30°) would not result in a material increase in circuit output.

In Fig. 11 the controller handle is shown positioned against its "off" position stop 139 in which the grid delay angle is 165°. The anode voltage is represented by curve 142 in Fig. 12 and by vector 143 in Fig. 13. The grid voltage is illustrated by curve 144 in Fig. 12 and vector 145 in Fig. 13. Accordingly, the circuit will invert load decay direct current to alternating current, as indicated in Fig. 16, to speed the decay of load current and render the dipper more responsive to gravity.

From the foregoing, it is clear that in our embodiment of the invention in which the hoist cable drum is supplied with power through an electromagnetic coupling which receives its excitation voltage from thyratron tubes in a three-phase circuit, control of excitation voltage is accomplished in stepless increments without material drag on the controller handle. Moreover, the disclosed circuit inverts field decay current to speed the gravity response of the dipper.

We claim:

1. An induction controller comprising a primary winding and paired secondary windings, means for shifting the relative position of the primary winding with respect to the secondary windings, said means having a neutral position in which the primary winding is substantially intermediate said secondary windings and in which a voltage of small magnitude is induced in both secondary windings in out-of-phase relationship to the voltage of the primary winding.

2. A control circuit for selectively exciting dual field coils of a dynamoelectric machine, said circuit comprising a thyratron control tube for each field coil, a reference source of alternating current voltage in circuit with said field coils and the anodes of said tubes, means for selectively firing one or the other of said tubes to selectively excite one or the other of said field coils, a source of alternating current voltage which is out of phase with said reference source and in circuit with the grids of said tubes, an induction controller having a primary winding in circuit with a source of alternating current voltage in phase with said reference source, said induction controller having dual secondary windings in circuit respectively with the grids of said tubes and said source of grid bias alternating current voltage, the grid bias voltage being vectorially additive to the voltages induced in the secondary windings of said induction controller, and means for shifting the position of said primary winding relative to said secondary windings whereby to selectively induce in said secondary windings voltages which are in phase and out of phase with the grid bias voltage whereby one of said tubes is biased to cut off and the other said tube is fired, said primary winding having a neutral position with respect to which both secondary windings have a small induced voltage out of phase with the reference voltage whereby said grids will be maintained at a negative grid voltage notwithstanding the failure of the grid bias voltage.

3. An electrical control circuit for controlling the excitation of a dynamo in a power excavator, said circuit comprising a generator having paired input windings with reverse polarity, and a control circuit for selectively energizing one or the other of said generator input windings, said control circuit comprising for each said winding a thyratron having an anode in circuit therewith, said thyratron having a grid and an induction controller in circuit therewith and a source of grid bias voltage, the grid bias voltage being at an oblique phase angle with respect to the anode voltage, said induction controller comprising a primary winding and a secondary winding and means for shifting the relative position of said windings whereby the magnitude of voltage induced in said secondary winding from said primary winding may be varied, said grid bias voltage and the voltage in the secondary winding in the induction controller being vectorially additive whereby a change in the magnitude of the induced voltage in the secondary winding will result in a change in the phase angle between the anode voltage and the resultant grid voltage to change the firing point of the thyratron, the respective grids of the respective thyratrons being each provided with secondary windings inductively related to the said primary winding whereby shifting of said windings will simultaneously change the excitation of the respective grids in opposite directions of magnitude, both said secondary windings being physically related to the said primary winding in such a manner that in the neutral position of the primary winding both said secondary windings will have induced therein a negative voltage of small magnitude whereby said thyratrons will be biased to cut off notwithstanding unexpected failure of said grid bias voltage.

4. An electronic control circuit for controlling the excitation of a field coil of an electromotive machine, said circuit comprising a source of alternating current voltage, a thyratron in series circuit with said field, an induction controller comprising primary and secondary windings, a source of alternating current excitation voltage for said primary winding substantially in phase with the voltage source for said field, said secondary winding being open circuited through the grid of said thyratron, and means including a handle for changing the mutual inductance between said primary and secondary windings to change the excitation voltage applied to said grid, there being substantially no current flow in the grid circuit of the thyratron whereby substantially no torque is imposed on the handle to resist its movement, in combination with a second field coil, second thyratron and a circuit for connecting said second field coil, thyratron and source of alternating current voltage in series, said induction controller comprising a second secondary winding and means for changing the mutual inductance between said primary and said second secondary windings, and means including said handle interconnecting said windings whereby said thyratrons will be cut off and fired in a predetermined relationship depending on the position of the controller handle, said handle having a neutral position in which a small out-of-phase thyratron cut-off bias voltage is applied to the grids of both said thyratrons.

5. An electronic circuit for controlling the excitation of a field coil of an electromotive machine in a power shovel, said circuit comprising a main three-phase source of alternating current voltage, a thyratron for each said phase and circuit means connecting said thyratrons in series circuit with said field whereby each thyratron may conduct for a maximum of one-third of a full cycle of alternating current, a three-phase induction controller comprising a three-phase primary having a source of alternating current voltage substantially in phase with the main three-phase source of alternating current and a three-phase secondary having windings respectively open circuited through the grid electrodes of the respective thyratrons, means for shifting the relative positions of the primary and secondary windings of said induction controller whereby to shift the phase angle between the alternating current voltage impressed on said grids and the main source of alternating current voltage for concurrent control effects on said thyratrons.

6. The device of claim 5 in which said shifting means comprises means for selectively positioning said windings in a range of movement between substantially maximum thyratron output and a negative output in which inversion of decaying load current in the field to the main alternating current source occurs.

7. A control circuit for electromotive machinery in a power excavator including a dynamo having an inductive field coil, a source of alternating current voltage and a thyratron having an anode in series with said field coil and source, said thyratron having a grid and means for variably exciting said grid whereby to selectively fire the thyratron during the positive pulse of source voltage, and a current sustaining circuit for said field coil comprising a back rectifier circuit and ballast resistance in series parallel with said field coil with respect to said anode and source voltage.

8. In an excavator having power means for the hoist, swing, crowd and propel motions thereof, said power means comprising for at least one of said motions an electromotive machine having a field coil and an electric control circuit therefor including a controller having a handle subject to manual manipulation, the improvement in said control circuit for substantially completely eliminating the resistance offered by the controller to changes in the position of its handle and comprising an electron valve having an output element in circuit with said field coil, said controller comprising primary and secondary windings in inductive relationship, said electron valve having a control element in circuit with the secondary winding of said controller, said controller handle comprising means for changing the mutual inductance between said primary and secondary windings whereby to selectively vary the voltage output of said secondary winding and in turn vary the voltage output of said electron valve to variably energize said field coil, the secondary winding of the induction controller being substantially open circuited through said electron valve whereby very little current will flow in the secondary winding of the controller and very little resistance torque to the movement of the controller handle will be developed in said secondary winding.

9. The device of claim 8 in which said electromotive machine comprises a dynamo having two field coils of relatively reversed polarity, there being an electron valve in circuit with each of said field coils, said controller having dual secondary windings respectively connected to the control elements of said valves, said controller comprising means for concurrently inducing voltage of opposite polarity in said secondary windings whereby to increase the energization of one of said field coils while concurrently decreasing the energization of the other of said field coils.

10. The device of claim 8 in which said electromotive means comprises a magnetic clutch, a polyphase power supply for the field coil of said clutch, there being an electron valve in ecah phase of said polyphase power supply, said controller being provided with polyphase secondary windings, each winding being disposed respectively in circuit with control elements of said valves for concurrent control effects thereon.

11. The device of claim 8 in which said circuit from said control element to the secondary winding of the controller includes a high resistance element to limit flow of current in said circuit.

12. In a power excavator having a dipper and hoist mechanism for lifting the dipper against gravity and for permitting the dipper to descend under gravity bias, an electric A. C. power source and electromagnetic coupling connected to said hoist mechanism, said coupling having a field coil in circuit with said power source and electric control circuit means for said field coil whereby to control the amount of power delivered by said source to said field coil, said control circuit comprising an electron valve in circuit with said field coil and power source, said valve having a control element and a controller in circuit with said control element whereby the power delivered by said power source to said field coil is controllably varied, said controller having a position in which said electron valve can only conduct for a fraction of the positive pulse of A. C.

voltage of said power source, said field coil constituting an inductive load in which electrical energy is stored, said electron valve comprising means when said controller is in said position for inverting electrical energy stored in the field coil of the coupling and supplying electric energy to said power source to cause rapid decay of the field flux in said field coil and thus permit rapid descent of the dipper under its gravity bias.

References Cited in the file of this patent

UNITED STATES PATENTS

| | | | |
|---|---|---|---|
| 2,088,659 | Moseley | Aug. 3, | 1937 |
| 2,092,545 | Alexanderson | Sept. 7, | 1937 |
| 2,533,069 | Tyrner | Dec. 5, | 1950 |
| 2,571,454 | Jones et al. | Oct. 16, | 1951 |
| 2,725,511 | Jacobs | Nov. 29, | 1955 |